(12) United States Patent
Cabanillas Saldaña

(10) Patent No.: US 8,237,098 B2
(45) Date of Patent: Aug. 7, 2012

(54) DUAL-AXIS SOLAR TRACKER

(75) Inventor: Juan Pablo Cabanillas Saldaña, Toledo (ES)

(73) Assignee: Cabanillas Ingenieros, S.L., Toledo (ES)

( * ) Notice: Subject to any disclaimer, the term of this patent is extended or adjusted under 35 U.S.C. 154(b) by 751 days.

(21) Appl. No.: 12/444,824

(22) PCT Filed: Oct. 9, 2007

(86) PCT No.: PCT/ES2007/000574
§ 371 (c)(1),
(2), (4) Date: May 12, 2009

(87) PCT Pub. No.: WO2008/043871
PCT Pub. Date: Apr. 17, 2008

(65) Prior Publication Data
US 2010/0024861 A1 Feb. 4, 2010

(30) Foreign Application Priority Data

Oct. 9, 2006 (ES) .................................. 200602226 U
Oct. 25, 2006 (ES) .................................. 200602371 U
Dec. 22, 2006 (ES) .................................. 200602756 U

(51) Int. Cl.
F24J 2/10 (2006.01)
(52) U.S. Cl. ...................... 250/203.4; 126/573; 126/576; 126/600; 136/246
(58) Field of Classification Search ................ 250/203.1, 250/203.2, 203.3, 203.4, 222.1; 126/573, 126/576, 600, 605, 696; 136/244–246
See application file for complete search history.

(56) References Cited

U.S. PATENT DOCUMENTS

| | | | |
|---|---|---|---|
| 2,182,222 A | 12/1939 | Courtis et al. | |
| 4,256,088 A | 3/1981 | Vindum | |
| 7,357,132 B2 * | 4/2008 | Hayden | 126/604 |
| 7,884,279 B2 * | 2/2011 | Dold et al. | 136/246 |
| 2001/0036024 A1 | 11/2001 | Wood | |
| 2005/0109384 A1 | 5/2005 | Shingleton et al. | |

FOREIGN PATENT DOCUMENTS

ES 2 288 418 A1 1/2008
* cited by examiner

Primary Examiner — Kevin Pyo
(74) Attorney, Agent, or Firm — Sughrue Mion, PLLC

(57) ABSTRACT

The invention relates to a two-axle solar tracker, consisting of a moving supporting system for solar panels, which maximizes the energy production of said panels and which is formed by a vertical axle and a horizontal axle in relation to which the system rotates in order to track the sun's path. The aforementioned axles are components of a structure supported at the center and supported peripherally on wheels positioned on a running track or surface. The structure rotates about a fixed central point supporting the vertical axle of the tracker. At least one board is positioned on the horizontal axle of the structure in order to receive the solar modules or panels and said board(s) can rotate about the horizontal axle so that the solar panels are maintained perpendicular to the sun's rays.

15 Claims, 10 Drawing Sheets

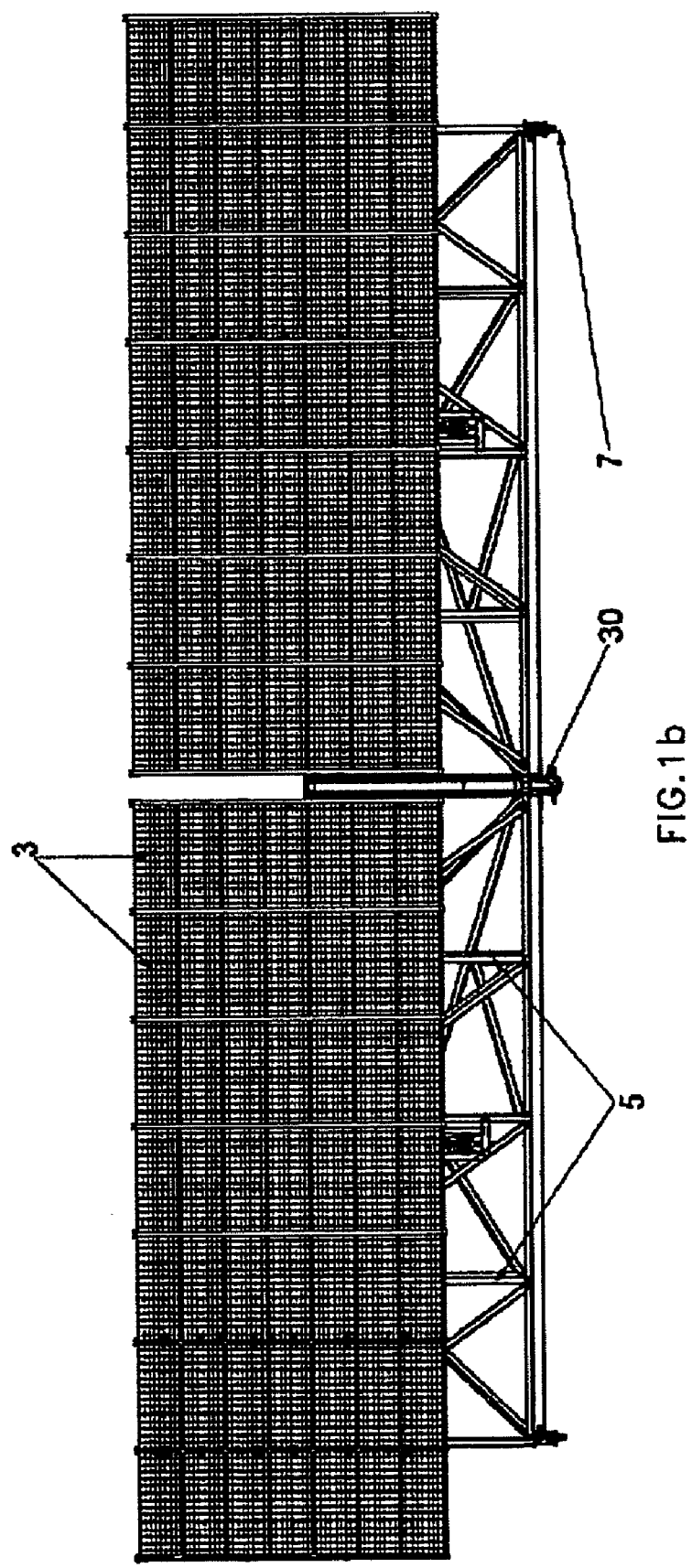

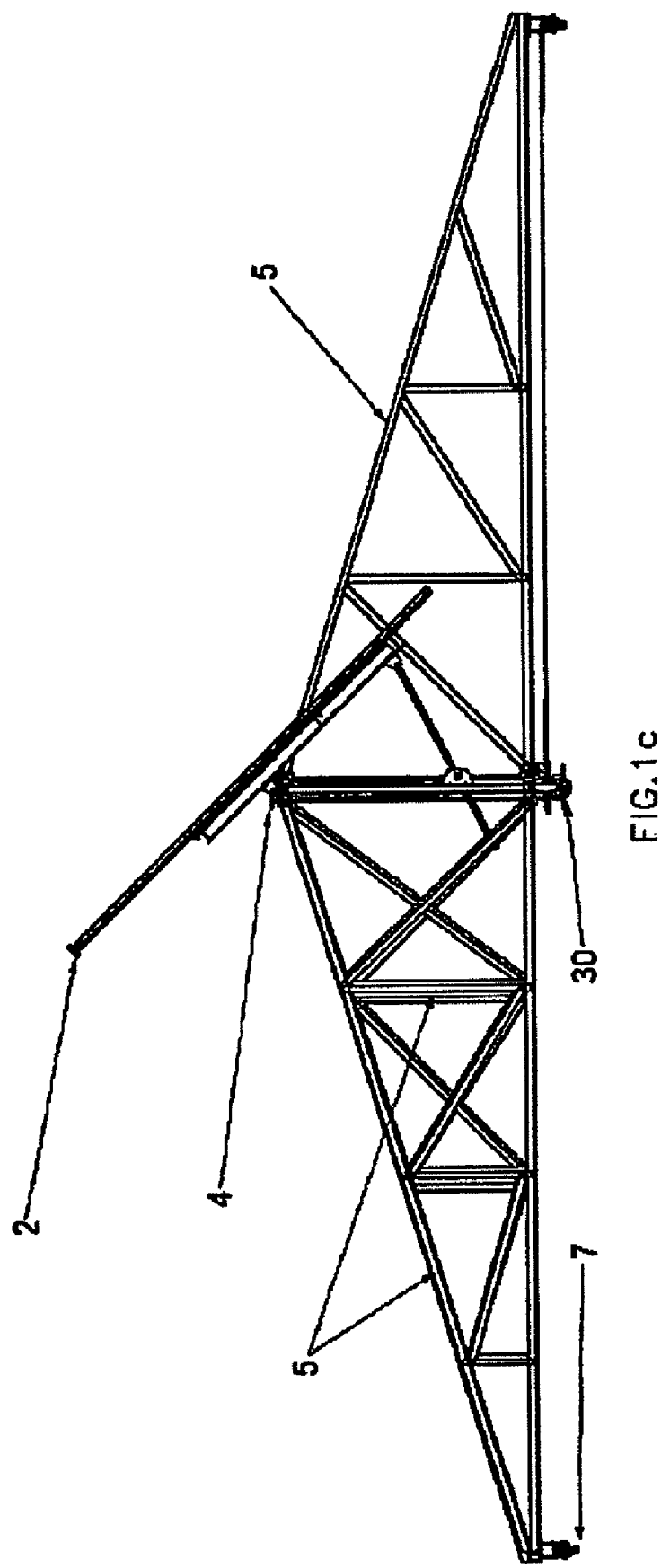

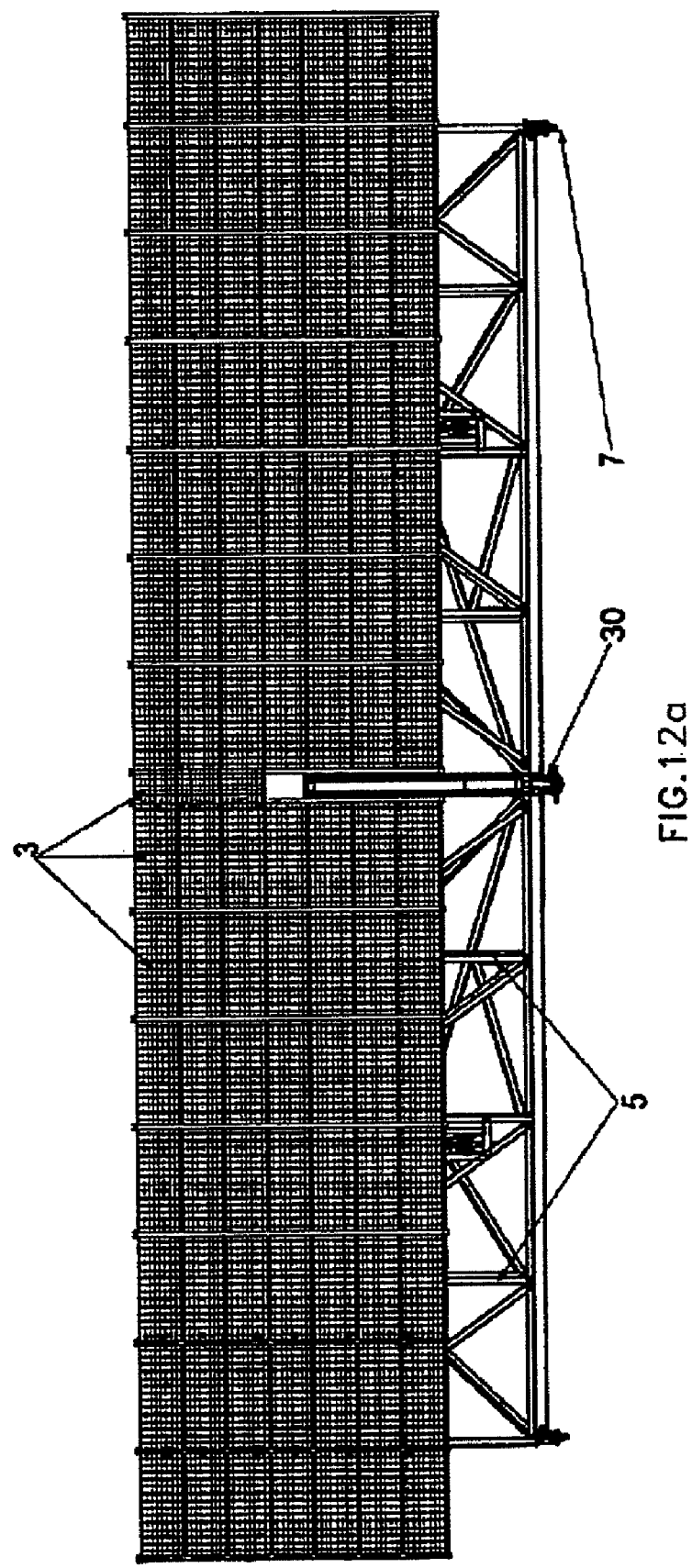

DUAL-AXIS SOLAR TRACKER

FIELD OF THE ART

The dual-axis solar tracker, object of the present patent application, relates to a moving support system for solar panels favoring as much as possible the energy production thereof, upon allowing the positioning of the plane of the solar panels in the perpendicular to the rays of sunlight during the entire day.

The main application of the present invention is the solar energy sector, and particularly, solar trackers or devices.

PRIOR STATE OF THE ART

Solar trackers such as that object of the present invention are not known in the state of the art, however other solar trackers are known which can be grouped in:
  Panels in a plane on a fixed monopost or the like, with a single central support,
  Panels in a plane on a lower non-rolling rotating frame, and
  Panels in multiple planes with multiple horizontal axes on an inclined structure (stands) with a lower rolling platform.

These types of trackers have their advantages and drawbacks but on the whole, considering that relating to manufacture, maintenance, reliability etc., the proposed invention provides a number of advantages since:
  it minimizes particular components involving a high price,
  it requires very little labor and materials in its manufacture and assembly, and
  it is a simple and efficient device.

Likewise, an additional problem of the known solar trackers rolling on a running surface or track, is that they require a perfect horizontalness of said running surface or track since due to their high rigidity and in the case that said surface or track was not perfectly horizontal, the passage of a wheel on a lower point thereof would cause said wheel to be suspended without touching the surface, and therefore when the wheel losing contact with the support surface or track is a tractor wheel a lack of traction would occur and would consequently make the rotation of the assembly difficult.

In addition, the solar panels to be assembled on the boards of the solar trackers of the state of the art are not standardized, therefore different solar panels would require boards with different dimensions. In the current state of the art said solar panels are usually arranged screwed to the profile forming the plane or board of panels, its main drawback being the requirements in its execution, such as the making of boreholes, precision in construction, the need to check the screws in the event of galvanization, accessibility to the board by the two sides thereof, etc., although without a doubt, the most important factor is time and therefore the labor necessary for assembling the panels with screws since it will be necessary to place them on one face of the board and screw them on the other face. This action is made very difficult due to the large dimensions of the planes formed by the panels. Likewise, the fact of using screws as a fixing of the panels makes it easy to steal them.

U.S. Pat. No. 4,256,088-A, describes a solar concentrator which includes a modularized point focusing solar concentrating panel which is movably mounted to track the sun. This panel has an overall parabolic reflecting surface and a triangular or approximately triangular configuration which improves structural integrity, minimizes wind resistance and permits rapid and easy stowing.

U.S. application No. US-2001036024-A1, describes a matrix solar dish concentrator with flexed glass mirrors is patterned from orthogonal planes parallel to the axis of symmetry of a paraboloid and intersecting the paraboloid, this pattern making all parabolic trusses uniform. The solar dish tracks the solar azimuth with a bicycle wheel and tracks the solar zenith with a television satellite dish actuator. A solar receiver is supported with a low shade structure outside a cone of concentrated sunlight.

DESCRIPTION OF THE INVENTION

As has already been mentioned, the present invention relates to a dual-axis solar tracker, specifically a vertical axis and another horizontal axis with respect to which it will rotate in order to track the path traced by the sun. Said axes are included as components of a metal profile structure supported at its center and on wheels in its periphery, in turn being supported on a running surface or track. The solar tracker, and therefore the mentioned structure, rotates on a fixed central point on which the vertical axis of the tracker is supported, said structure incorporating the horizontal axis on which at least one board is located for receiving the solar modules or panels, said board or boards being able to rotate on said horizontal axis so that the solar panels are maintained perpendicular to the rays of sunlight.

The solar panel or panels used for capturing solar energy are incorporated or assembled in the preferably metal solar tracker structure, specifically in one or more boards forming said structure. Said board or boards in turn form a plane which is maintained perpendicular to the rays of sunlight, i.e. the solar panels incorporated in the boards are maintained perpendicular for the purpose of achieving a better and greater capture of solar energy.

The board or board of the structure, and therefore the plane of solar modules or panels, is provided with two movements, a movement of rotation with respect to a vertical axis and a movement of rotation with respect to a horizontal axis, both axes being perpendicular to one another. The lower point of the vertical axis is fixed to the ground, such that the tracker rotates with respect to said fixed point, whereas the horizontal axis, perpendicular to the vertical axis, enables the rotation of the board or boards possible with respect to it. In the case of more than one board of panels, the rotation thereof in a synchronized manner, forming a single plane, is recommendable although such panels can evidently rotate in an asynchronous manner, i.e. independently, for example in those cases in which the means of the traction elements of any of the boards does not operate correctly.

The object of the present invention is therefore a dual-axis solar tracker which allows maintaining the perpendicularity of the solar modules or panels with respect to the rays of sunlight, independently of the position of the sun which changes throughout the day.

As has been mentioned the plane of panels is formed by at least one board, integrating the solar tracker structure and supporting the solar panels, said boards being supported on the mentioned rolling structure rotating with respect to the central point fixed to a footing for locking the entire assembly. The rolling structure, supported on the vertical axis at its center and on wheels in its periphery, some wheels being drive wheels and other wheels being support wheels, rotates due to the action of said drive wheels (motor-driven wheels with automated geared motors) on a running track or horizontal surface (ground, planar bed plate, concrete girder, metal profile, etc.).

The horizontal axis, which in the event that the tracker has two boards will be divided into two horizontal axes, is integrated in the rolling structure and determines and controls the rotation of the board or boards, and therefore of the plane of solar modules or panels, preferably by means of automated drives, for example worm screw mechanism geared motors. The rotation of the board or boards with respect to the horizontal axis or axes, and therefore of the solar panels with respect to the horizontal axis or axes is thus achieved with an easy automation for each day and time of the year. Said automated drives can be common for more than one board or be independent for each of the boards if these boards are independent, thus allowing the boards to be able to rotate in a synchronized manner but independently driven.

Both the rotation with respect to the vertical axis or point as well as with respect to the horizontal axis or axes is controlled by means of a control unit (of the optical type or programmable automaton type), being able to incorporate different sensors facilitating the position of the solar panels of the tracker depending on the position of the sun and of the meteorological conditions.

The rolling structure is formed by a structural assembly of lattice girders and as has already been mentioned, it is supported on the running surface through wheels and on a single, central and fixed vertical rotation point. The board or boards on which the solar panels are assembled form part of said structure as does the horizontal rotation axes. Said structure in turn has a projection at its front part by way of a nose providing great stability to the structural assembly and therefore to the solar device.

The solar tracker proposed by the invention likewise has a device allowing the correct operation thereof on a running surface which is not perfectly horizontal, thus adapting to the level variations of said surface.

Another object of the present invention is therefore a solar tracker which is able to prevent the level variations of its running and support surface, preventing the requirement of perfect horizontalness of the running surface on which the tracker is supported.

In order to achieve the foregoing, and more specifically in order to prevent the malfunction in the solar tracker due to the non-horizontalness of the running surface, the solar tracker object of the present invention will have its plane of panels formed by two boards of solar modules or panels.

Said two boards are anchored on a lattice girder which is part of the rolling support structure. The lattice girder forming the solar device is horizontally divided into two equal parts connected to the vertical axis given that each of the parts has an upper bar and a lower bar attached to the vertical axis by means of moving couplings. On the side opposite that of the coupling and at its lower part, i.e. at the outer lower ends of the lattice girder, there is at least a support and traction wheel on the running surface. The upper or lower side of the lattice girder defines a single imaginary horizontal axis in the event that the running surface is perfectly planar.

The need for the running surface on which the solar tracker rotates to be perfectly horizontal is prevented by means of the moving coupling mechanism which is detailed, since said mechanism allows the wheels to always make contact with the running surface or track regardless of the horizontalness thereof by means of the action of the actual weight of the wheels, therefore not losing traction and support.

Said moving couplings are formed, for example, by means of a hinge between the lower bars of the lattice girder and the vertical axis, said hinge transmitting all the stresses, except the rotating bending moment according to the hinge axis, generated between the girder and the central vertical axis.

Meanwhile, in the coupling between the upper bars and the central axis, a tongue and groove joint transmitting all the stresses between the upper bar and the vertical axis is used, the tongue and groove joint being of the type allowing the axial stress in the upper bars of the lattice girder to be only transmitted in a direction approaching the central vertical axis.

Not transmitting this stress in the direction of moving away from the central vertical axis is what allows the wheel to be supported on the surface or track even though it is not horizontal and has level differences.

The maximum raising and lowering limitations of the wheels are determined by:
  Maximum raising: the wheels can not be raised above the position in which the upper bar makes contact with the vertical axis in the tongue and groove joint.
  Maximum lowering: the wheels have the length of the tongue and groove joint located between the upper bars and central vertical axis as a lowering limit.

A final object of the invention is allowing the use of different dimensions in the tracker of solar panels, as well as the fixing thereof in the boards, solving the drawbacks of the non-standardization of the width, height and thickness of the solar panels or modules, allowing the use of different solar panels on the board or boards of the tracker according to the requirements of the final installer.

The system for fixing the solar modules or panels in the board or boards of the solar tracker requires the board or boards to be formed by a preferably rectangular frame inside which the girders having a metal profile slide, spacing them apart the width of the required panel. Said metal profiles form rails in which the solar panels will be housed and subsequently fixed without such solar panels needing to be screwed to the profiles of the boards. The flanges of said profiles must be equal to or less than the dimension of the framing of the panel for the purpose of not reducing the radiation emitted on the active surface of the panels. These profile girders can have any U-, I-shaped section etc.

Once the board incorporating a certain profile according to the measurement of the panel to be used in the rails of its profiles has been formed and assembled, the solar panels are introduced and slid therein, and if there are clearances it is then possible to use silicone points for preventing the movement of said panels in the rails due to the possible excessive clearance of the rail.

As has already been mentioned, each board is formed by a preferably metal frame with a UPN profile or the like and with guides or runners therein and preferably IPE or UPN profiles or the like, perpendicular to the main girders demarcating the perimeter of said frame and therefore of the board, said guides being coupled to the frame by means of attachments allowing the sliding thereof on the frame. With this arrangement the width between two guides can be adapted to the width of the solar modules or panels which must be slid between said guides.

The guides likewise have an eccentric flat bar dividing the height of said guide in its entire length into two parts, and as it is eccentric said two heights son different, also allowing the introduction of solar panels with different thicknesses. The guides have at their lower part a permanent closure or plug for preventing the solar panels from sliding and coming out of the rail when they are introduced between two guides. An opening and closing system is arranged at the upper part and in order to prevent the unwanted removal of the solar panels introduced in the rails.

In order to ensure the stiffening of each panel, steel cables with their corresponding tensioners are diagonally used, which cables attach the corners or edges of the board or boards with the central area of their frame, such that the cables structurally contribute to the maintenance of the "frame—guides—panel" assembly, providing a convenient and necessary securing (Saint Andrew's cross) in a simple manner.

DESCRIPTION OF THE DRAWINGS

The following drawings accompanying the description in a non-limiting manner are referred to below for the purpose of facilitating the understanding of the invention.

DESCRIPTION OF A PREFERRED EMBODIMENT

Figure 11:
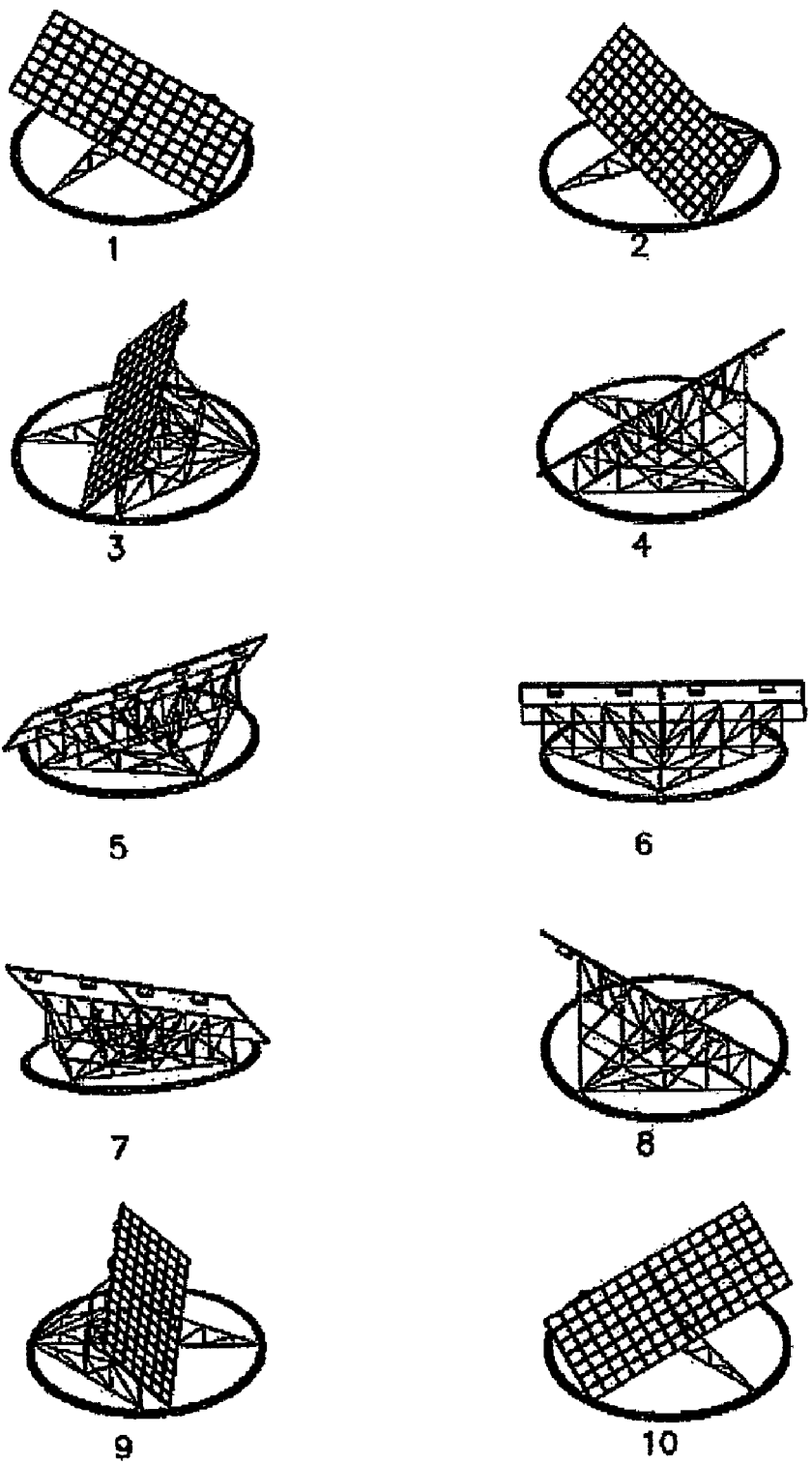
FIG. 11 shows the rotation sequence of the dual-axis solar tracker with respect to its vertical axis in ten of its positions.

The solar tracker object of the present invention is supported on a running surface or track, for example the ground, planar bed plate, or circular rail 6 and rotates with respect to its axis 8 and central point 30, which is fixed to the ground through a footing for locking the assembly. The solar tracker is formed by a rolling support structure 5 rotating with respect to said central point 30 and axis 8, said support structure 5 of the solar tracker being formed by a structural assembly 9, 10, 11 of metal lattice girders. As can be seen in the figures, particularly in FIG. 11, sequences A, B, C, D, H, I, J, the support structure 5 has a projection at its front part by way of a nose providing great stability to the structural assembly and therefore to the solar device.

The rotation of the solar tracker with respect to the vertical axis and therefore with respect to its central anchoring point 30 is achieved by means of using support wheels 7, at least two of which will be motor-driven. The fact of placing geared motors or rotation drives in the wheels, i.e. in the edge of the structure instead of in the vertical rotation axis, allows reducing the size of said geared motors upon requiring less power due to the large action arm.

The support structure 5 is likewise useful as a support for the horizontal axis 4 of each board 2 of the solar tracker. The solar panels 3 forming the plane of panels of the tracker and which are responsible for capturing rays of sunlight are fixed in said boards 2.

Worm screw drive geared motors, for example, are used for the movement of the boards 2, and therefore of the panels 3, with respect to the horizontal axis 4. The fact of being able to have a drive device for each board 2 allows the movement of each board 2 with respect to the horizontal axis 4 to be able to be synchronized but independent.

The boards 2 likewise have weighting elements in order to minimize the compression work of the drive as well as their buckling.

As has already been described, the dual-axis solar tracker 1 is formed by two support boards 2 of solar panels 3 and each board is integrated with a horizontal rotation axis 4, each board rotating with respect to its corresponding horizontal axis 4, said axes 4 being fixed on the rolling support structure 5 of the solar tracker.

Said structure 5 is formed by a structural assembly of lattice girders and is supported on the running surface 6 through wheels 7 as well as on a rotation point 30.

The two boards 2 are supported on a lattice girder 9, perpendicular to the running surface 6 and which is divided into two equal parts by the vertical axis 8. Each of the parts of said lattice girder 9 has an upper bar 10 and a lower bar 11 which are secured by means of moving couplings to the vertical axis 8, a tongue and groove joint 13 and a hinge 12 respectively. It likewise has, at its outer lower ends, support wheels 7 which are preferably motor-driven and drive the tracker 1, making it rotate with respect to the central point 30.

Figure 1A:
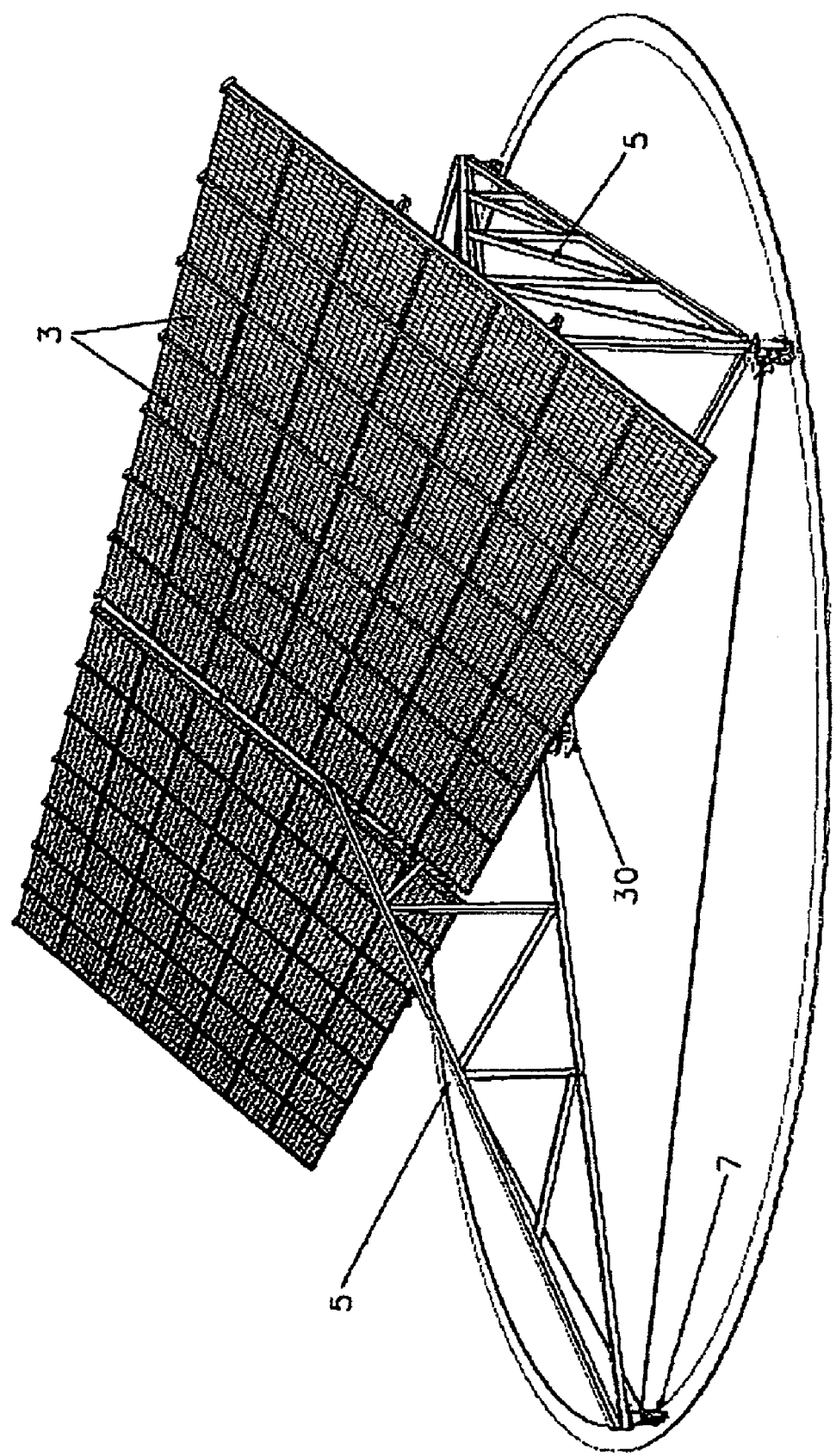
FIG. 1 shows a perspective view (1a), a front elevational view (1b) and a side elevational view (1c) of the solar tracker object of the present invention.
Figure 2:
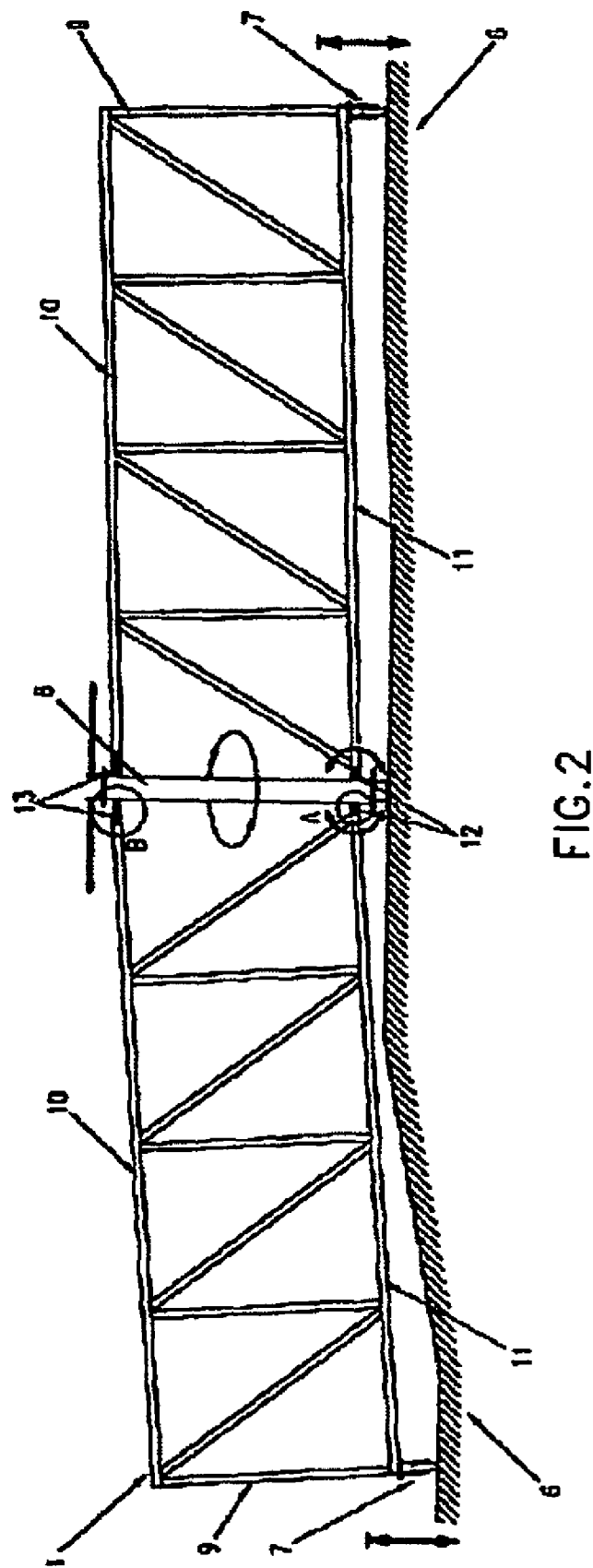
FIG. 2 shows the side elevational view of the lattice girder, central axis and running assembly.
Figure 4:
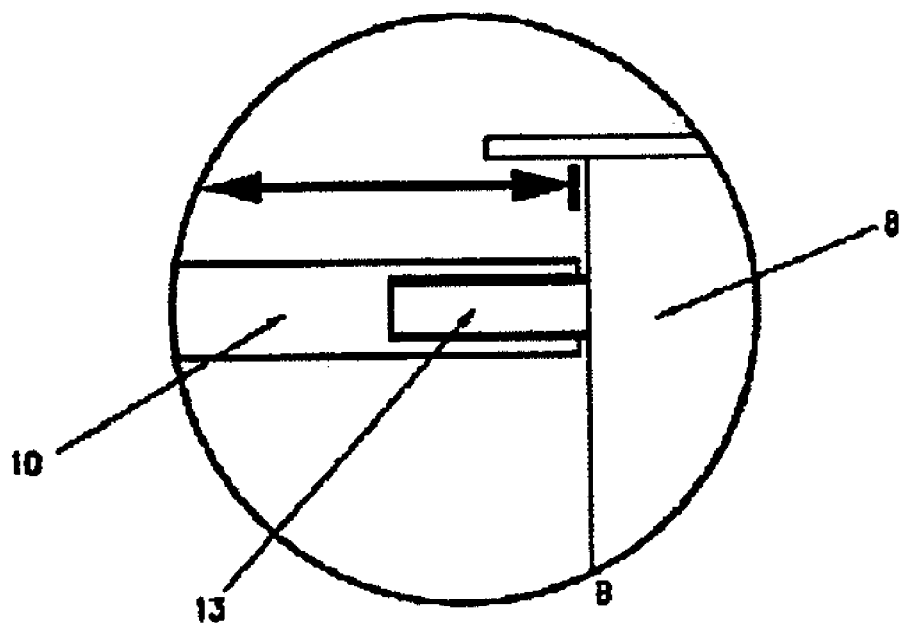
FIG. 4 shows detail B of FIG. 2.
Figure 3:
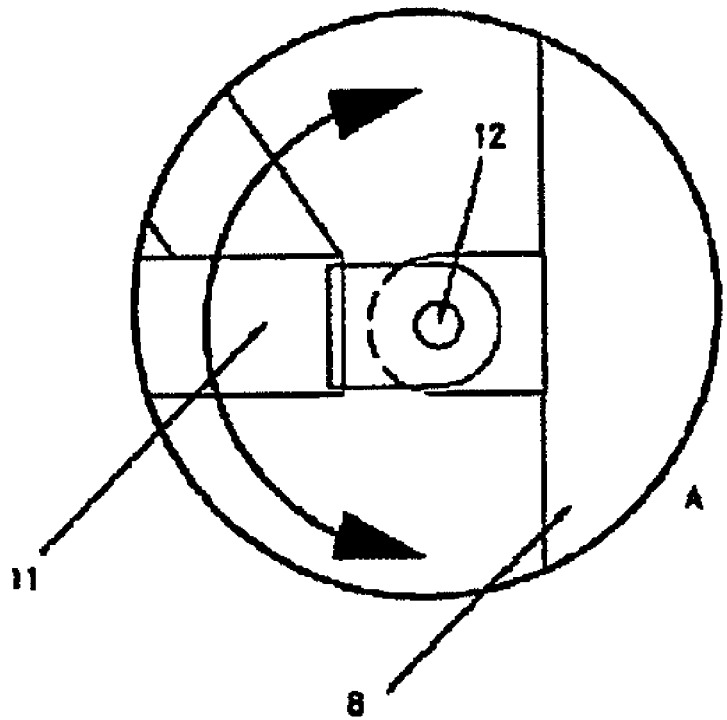
FIG. 3 shows detail A of FIG. 2.
Figure 5:
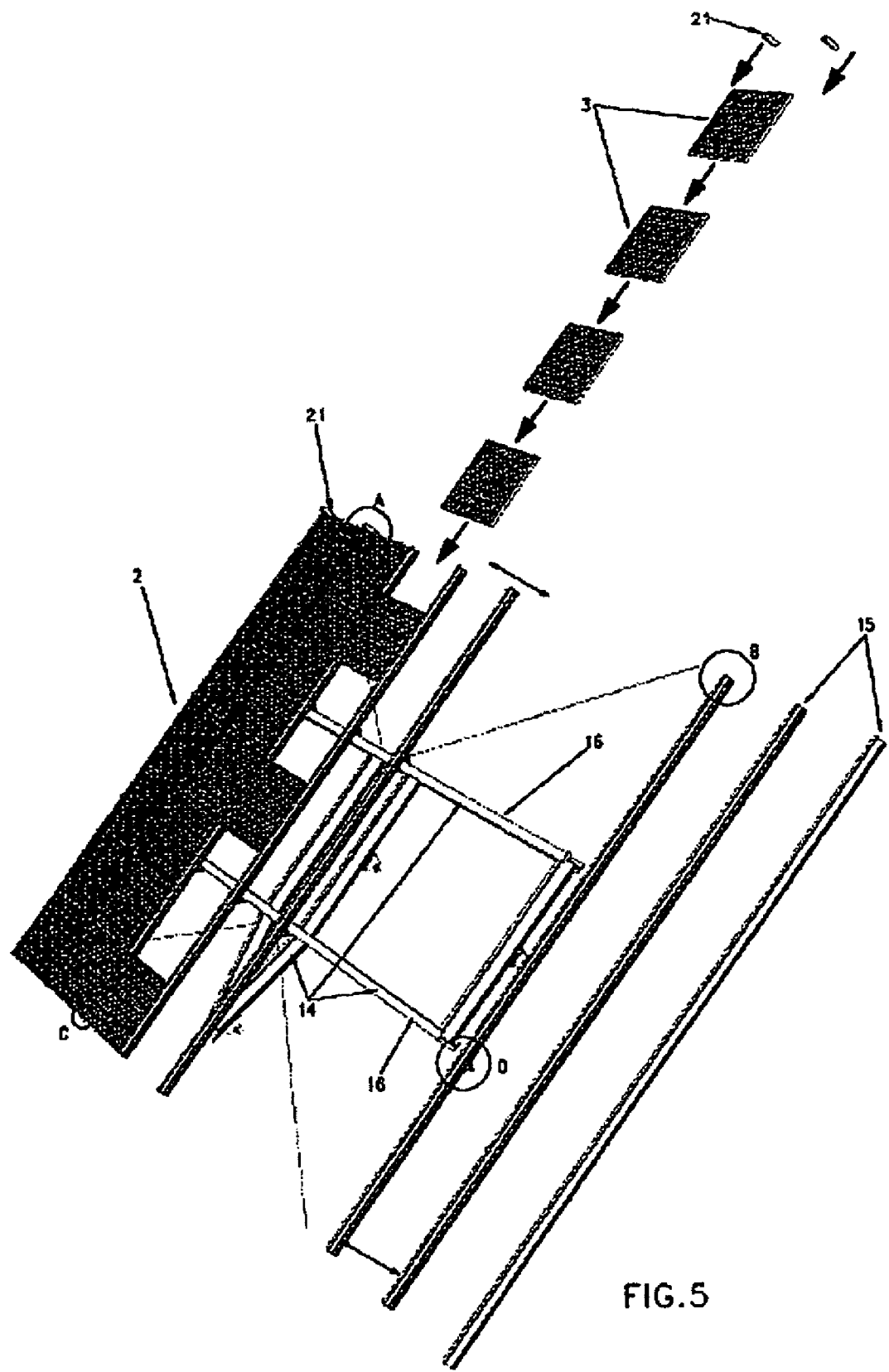
FIG. 5 shows an exploded view of the assembly of the solar panels in a board according to the present invention.
Figure 6:
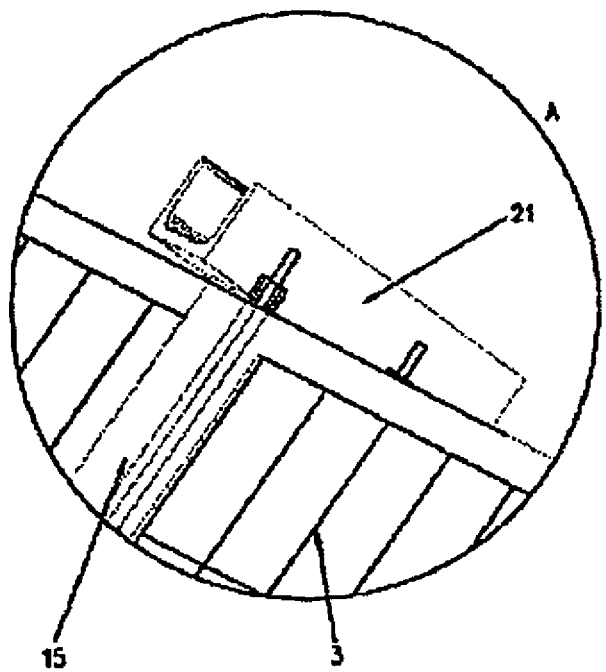
FIG. 6 shows a possible solution of detail A of FIG. 5.
Figure 7:
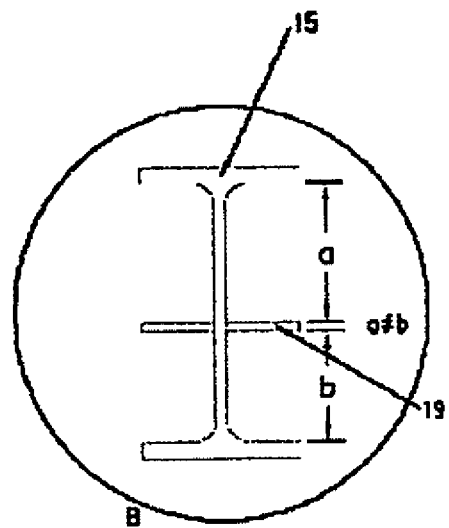
FIG. 7 shows detail B of FIG. 5.
Figure 8:
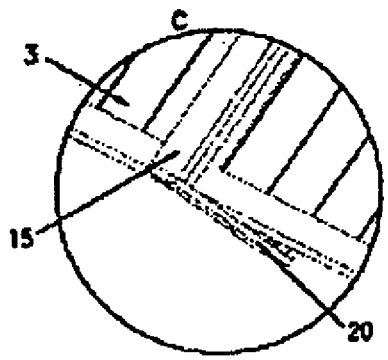
FIG. 8 shows detail C of FIG. 5.
Figure 9:
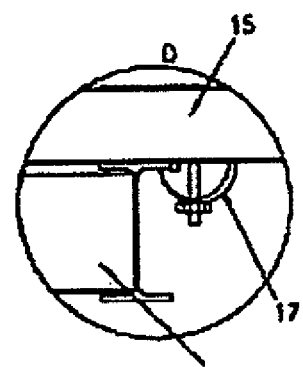
FIG. 9 shows detail D of FIG. 5.
Figure 10:
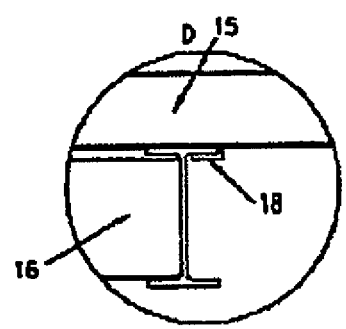
FIG. 10 shows an alternative to detail D of FIG. 5.

In the event that the running surface 6 is not perfectly horizontal, see FIG. 2, and in order to prevent one of the wheels 7 from being in midair without making contact with the surface 6 and therefore making the traction impossible and affecting the rotating movement of the tracker 1, the tongue and groove joint 13 of the upper bar 10 and the hinge 12 of the lower bar 11 allow the wheel 7 to keep making contact with the running surface 6 regardless of the level changes thereof. The hinge 12 allows the lower bar 11 to rotate lowering its end such that the tongue and groove joint 13 of the upper bar 10 slides the necessary distance. The maximum lowering limit of the wheel 7 is determined by the length of the tongue and groove joint 13.

The system is equally functional when the running surface 6 is raised, but in this case the hinge 12 allows the lower bar 10 to rotate lifting its end and the tongue and groove joint 13 is shortened. The maximum raising limit of the wheel 7 is determined by the contact between the upper bar 10 and the vertical axis 8.

If the horizontalness of the running surface is ensured it is possible for the solar tracker to have a single horizontal axis 4 with two boards 2 on each side of the vertical axis 8 instead of a horizontal axis for each board.

The objective of the solar tracker 1 is, as its own name indicates, to track the path traced by the sun attempting to capture the greatest amount of rays of sunlight. In order to do this, in addition to describing a rotating movement on the vertical axis 8, it has the mentioned solar panels 3 in the two boards 2 located on a frame 14 so that by means of the rotating movement with respect to the horizontal axis 4 the panels remain perpendicular to the rays of sunlight.

Each of said boards 2 has a preferably rectangular frame 14 with its two main bars 16 parallel to the upper bar 10 of the lattice girder 9. The sides of the frame 14 are formed by an IPN profile or the like. For supporting the panels 3 on said frame 14, the tracker 1 has guides or runners 15 which are located on the frame 14 perpendicular to the main bars 16. Said guides 15 are coupled and slide on the frame 14, specifically on the main bars 16 of the frame 14.

Said sliding and securing is achieved by means of sliding attachments 18, of the folded sheet type sliding along the flanges of the frame, or screwed clamps 17. Specifically, the clamps are formed by a semicircular shaped element which is screwed at its center to the sliding guide 15, is connected to said guide 15 at one of its ends and is free at the opposite end. There is thus a space between the free end of the clamp and the guide 16, a space in which a flange of the IPN profile of the longest side of the frame 16 is housed, and after sliding along said frame 14 until achieving the width of the solar panel 3 to be introduced between two consecutive guides 15 forming a rail, the inviolable screw of the clamp 17 is tightened, thus ensuring the position of the guide 15 on the frame 14.

The sliding attachment, the folded sheet 18 sliding along the flanges of the frame, is connected to the sliding guides or runners 15, determining a space between one side of the folded sheet 18 and the guide or runner 15 intended to partially house, as occurs with the previous example of the clamp, the main bar 16, the longest bar of said frame 14.

The foregoing are two preferred embodiments of the adaptation system for adapting the boards in order to house solar panels with different dimensions according to the needs or preferences of the installer, said adaptation and securing system being able to use other components both for facilitating the sliding of the guides and their subsequent securing and for securing the panels to said guides.

The guides 15, preferably with an IPE profile, have an eccentric flat bar 19 dividing the height of said guide 15 in its entire length into two parts, and as it is eccentric said two heights (a, b) are different, which also allows using the solar tracker 1 not only with solar panels 3 with different widths but also with different thicknesses.

The assembly of the solar panels 3 in the solar tracker 1 through the boards 2 formed by the frame 14 and the guides 15 is simple and is carried out as is detailed below.

The guides 15 are first fitted to the width of the solar panels 3 which will be used in the tracker 1 by means of the sliding thereof along the sides 16 of the frame and the fixing of the clamps 17. Once the rails for housing the panels 3 are ready, the panels 3 start to be introduced between the guides and according to their thickness supported on the flat bar 19 of the guide 15 or below said flat bar 19.

The solar panels 3 are closed when they reach the end part of the guide 15, thus preventing them from coming out of the rail, by a permanent closure 20, and once all the panels have been introduced in the corresponding rail, said rail is closed by means of a UPN profile 21 or the like, which is fixed to the corresponding end by way of a lid by means of a nut which can be an inviolable or antitheft nut.

Finally, and once the panels 3 have been introduced into both boards 2 of the solar tracker 1 and in order to ensure the stiffening of each board 2, steel cables 22 with their corresponding tensioners are used, which cables attach the corners and edges of each board with the central area of their frame, such that the cables structurally contribute to the maintenance of the "frame—guides—panel" assembly, providing a convenient and necessary securing in the form of a Saint Andrew's cross in a simple manner.

Figure 12B:
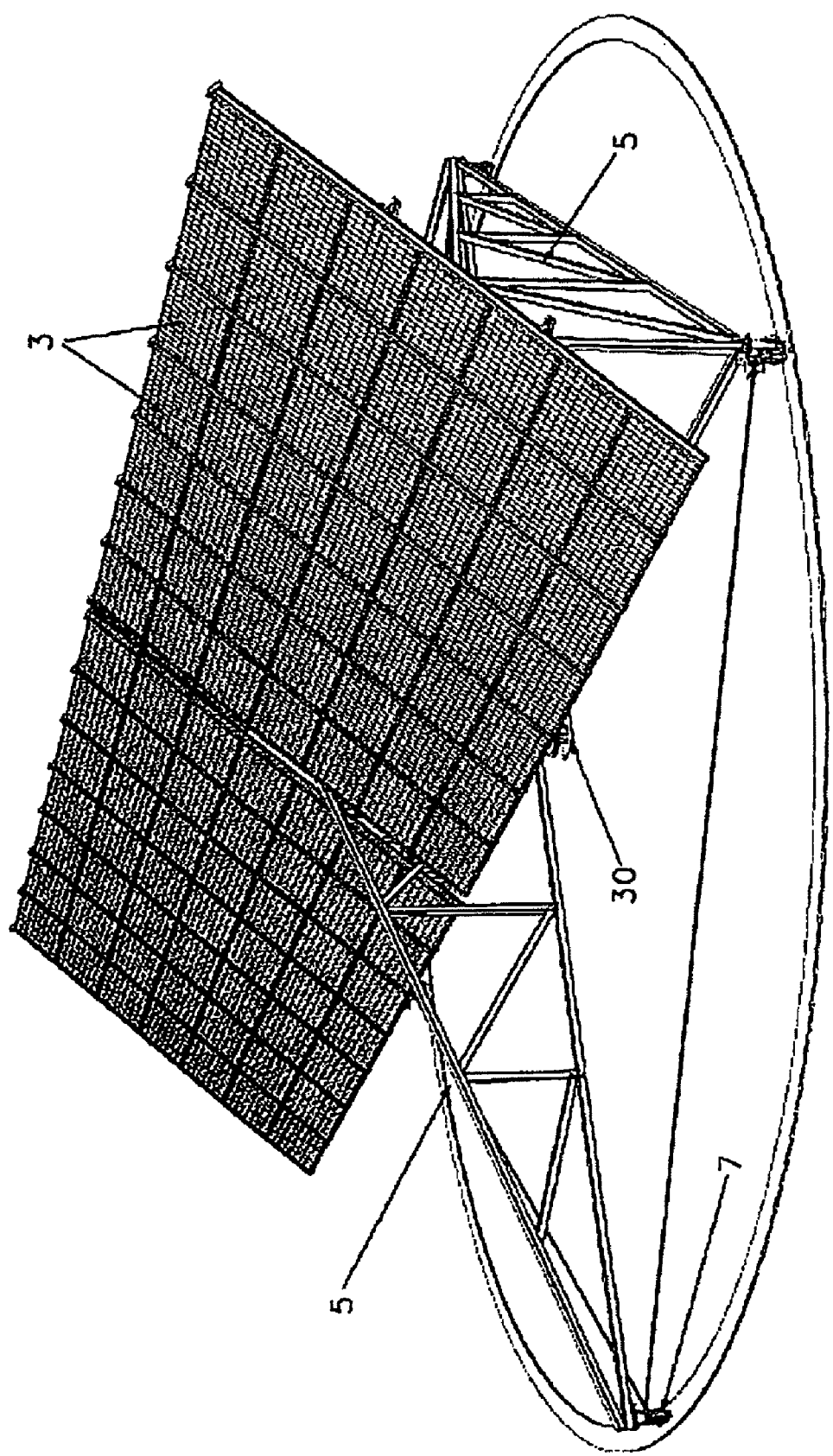
FIG. 12 shows a front elevational view (12a) and a perspective view (12b) of the solar tracker object of the present invention with a single board of solar panels.

Another embodiment, shown in FIG. 12, shows a solar tracker which only includes a single board of solar panels rotating with respect to a horizontal axis.

The invention claimed is:

1. A solar tracker (1), of the type allowing the solar panels (3) to be maintained perpendicular to the rays of sunlight, characterized in that it comprises:
   A plane determined by at least one board (2) incorporating the solar panels (3), fixed on a rolling support structure (5), formed by a structural assembly of lattice girders, with a horizontal rotation axis (4),
   a central point (30) on which there is arranged a single fixed vertical rotation axis (8), centered with respect to the rolling support structure (5) and supporting said rolling support structure (5) with at least one board (2),
   a projection at the front part of the rolling support structure (5) by way of a nose, and
   automated systems driving the rotation with respect to both axes (4, 8), a first rotation of at least said one board (2) with respect to said horizontal axis (4) and a second rotation of the vertical axis (8) of the structure (5) with respect to the central point (30) on a running surface or track (6).

2. The solar tracker according to claim 1, characterized in that it has wheels (7) located at the lower part of the rolling support structure (5) for the rotation with respect to the vertical rotation axis (8), and support on the running surface (6).

3. The solar tracker according to claim 2, characterized in that the horizontal rotation axis (4) is located on a lattice girder (9) which is part of the support structure (5) and perpendicular to the running surface (6), said lattice girder (9) being horizontally divided into two equal parts by the vertical axis (8) and each of these parts has an upper bar (10) and a lower bar (11) connected to the vertical axis by means of moving couplings (12, 13), each of the outer lower ends of the lattice girder (9) having at least one of the mentioned wheels (7) on the running surface (6).

4. The solar tracker according to claim 3, characterized in that the lower bars (11) of the lattice girder (9) are connected to the vertical axis (8) by means of a hinge (12) transmitting the stresses generated between the lattice girder (9) and the central vertical axis (8).

5. The solar tracker according to claim 3, characterized in that the upper bars (10) of the lattice girder are connected to the vertical axis (8) by means of a tongue and groove joint (13) transmitting the stresses between the lattice girder (9) and the central vertical axis (8), allowing the axial stress in the upper bars (10) of the lattice girder (9) to only be transmitted in the direction approaching the central vertical axis (8) of the bar (10).

6. The solar tracker according to claim 3, characterized in that the contact between the upper bar (10) and the vertical axis (8) limits the maximum raising position of the support wheels (7) located at the outer lower ends of the lattice girder (9).

7. The solar tracker according to claim 5, characterized in that the maximum lowering position of the support wheels (7) is determined by the length of the tongue and groove joint (13).

8. The solar tracker according to claim 3, characterized in that each of the two parts of the lattice girder (9) determines a horizontal axis (4) so that each of them supports a support board (2) of the solar panels (3), rotating or turning with respect to said horizontal axes (4).

9. The solar tracker according to claim 2, characterized in that at least two of said wheels are motor-driven and the rest are support wheels.

10. The solar tracker according to claim 1, characterized in that each board has at least one worm screw driven by a geared motor for rotating each board with respect to the horizontal axis.

11. The solar tracker according to claim 1, characterized in that the boards rotate with respect to the horizontal axis in a manner synchronized with one another.

12. The solar tracker according to claim 1, characterized in that the boards rotate with respect to the horizontal axis in a manner independent from one another.

13. The solar tracker according to claim 1, characterized in that the support boards (2) of the solar panels (3) comprise a rectangular metal frame (14) with guides or runners (15) for introducing the solar panels (3) between two of said guides or runners (15) that are perpendicular to the longest side (16) of the frame (14) and sliding along such frame, such guides or runners being coupled to said frame (14) by means of attachments (17, 18) allowing the sliding of said guides or runners (15) on said frame (14, 16).

14. The solar tracker according to claim 12, characterized in that said sliding attachment is a semicircular shaped clamp (17) screwed at its center to the sliding guides or runners (15) and integral at one of its ends with the guide or runner (15) and free at the opposite end, determining a space between said free end and the base of the guide or runner (15) intended to partially house the longest side (16) of said frame (14).

15. The solar tracker according to claim 12, characterized in that said sliding attachment is a folded sheet (18) integral with the sliding guides or runners (15), determining a space between one side of the folded sheet (18) and the guide or runner (15) intended to partially house the longest side (16) of said frame (14).

\* \* \* \* \*